United States Patent [19]

Irwin

[11] 3,916,440

[45] Oct. 28, 1975

[54] RESYNCHRONIZABLE PHASE-ENCODED RECORDING

[75] Inventor: John W. Irwin, Loveland, Colo.

[73] Assignee: International Business Machines Corporation, Armonk, N.Y.

[22] Filed: Dec. 23, 1974

[21] Appl. No.: 535,598

[52] U.S. Cl. .................................... 360/50; 360/48
[51] Int. Cl.[2] .......................................... G11B 5/02
[58] Field of Search .................... 360/42, 48, 50, 51

[56] References Cited

UNITED STATES PATENTS

| | | | |
|---|---|---|---|
| 3,795,903 | 3/1974 | Lindsey | 360/48 |
| 3,829,837 | 8/1974 | Farr, Jr. | 360/49 |
| R28,265 | 12/1974 | Irwin | 360/50 |

*Primary Examiner*—Vincent P. Canney
*Attorney, Agent, or Firm*—Herbert F. Somermeyer

[57] ABSTRACT

Special signal patterns interleaved among phase-encoded data patterns enable intrarecord resynchronization, such as shown in U.S. Pat. No. 3,641,534. The selected patterns are legal data patterns such that any recorder can record the interleaved resynchronization pattern. Readback circuits, such as shown in the above patent, predict when the resynchronizing pattern will occur facilitating resynchronization. Being legal data patterns, tape recorders not having resynchronizing circuits can read the records having the resynchronizing patterns without generating faul conditions. Both unidirectional and bidirectional resync are provided.

13 Claims, 8 Drawing Figures

RESYNCHRONIZABLE PHASE-ENCODED RECORDING

DOCUMENT INCORPORATED BY REFERENCE

Irwin U.S. Pat. No. 3,641,534, particularly FIGS. 2, 7, and 8.

BACKGROUND OF THE INVENTION

This invention relates to digital signal recorders, particularly to those recorders employing phase-encoded recording.

Phase-encoded recording and NRZI recording have been widely accepted as digital data recording formats. In constructing digital signal recorders, one of the main features is that the newer design recorders are backwards compatible, that is, can read data formats that have been used in the past, particularly when the media has the same width, such as ½ inch tape. The above-indicated U.S. Pat. No. 3,641,534 provides resynchronization for many formats, but excludes present-day phase-encoded recording format insofar as recording resynchronizable patterns are concerned. The patented apparatus does show resynchronizing readback circuits capable of operating with the later-described invention of this application. By altering the phase-encoded recorders, the invention of U.S. Pat. No. 3,641,534 could be applied; however, the expense may not warrant the change at present-day phase-encoded recording density of 1,600 cpi.

Accordingly, it is desirable to provide resynchronizing capability to standard phase-encoded recording with a minimum of additional expense for enhancing utilization of phase-encoded recording with extra-long record lengths. Without such resynchronization, error conditions in phase-encoded records are propagated throughout the record. Such error propagation can be arrested through the use of resynchronizable patterns.

SUMMARY OF THE INVENTION

Apparatus employing the present invention uses standard format phase-encoded recording with special interleaved resynchronizing patterns which may bear legal or valid data patterns.

In a first aspect of the invention, an asymmetrical resync pattern is provided, i.e., intrarecord resync only in one direction of tape transport. In another aspect, symmetrical resync is provided; i.e., resynchronizable circuits are operable in both directions of tape transport.

The resynchronizable patterns for even-numbered resyncs and odd-numbered resyncs alternate between tracks such that some of the more reliable tracks, i.e., the center tracks, are resynchronizable every other resync pattern. For example, in one embodiment, the parity track 8 had all 1's during the resync patterns; while all of the other eight tracks had all 0's, followed by an all-1's marker. all eight tracks but the parity track were resynchronizable in this particular resync pattern, termed an even-numbered resync pattern. In an odd-numbered resnyc pattern, a second track other than the parity track contained all 1's; while the parity track and the remaining seven tracks contained all 0's followed by an all-1's marker for resynchronizing those eight tracks. The track other than the parity track can be tracks 0, 1, or 2, for example.

For symmetrical resync, it is preferred to have a plurality of tracks with all 1's, i.e., nonresynchronizable. In one example, for even-numbered resync, tracks P, 7, and 1, had all 1's; while the remaining seven tracks had all 0's and were resynchronizable. In the alternate pattern, three tracks had all 1's, 0, 2, and 3, with the remaining six tracks being resynchronizable. In both instances, the outer tracks, i.e., the tracks adjacent the longitudinal edges of the tape, were always resynchronizable for each resync pattern. Any mix of the above-described patterns may be used.

The spacing of the resync patterns is preferably based upon the power of 2, for example, 256 bytes. With a 20-byte resync pattern, there are remaining 236 data bytes. Of course, the spacing could be 1,024, etc., depending upon the data integrity desired and other operational aspects beyond the scope of the present description.

The foregoing and other objects, features, and advantages of the invention will become apparent from the following more particular description of a preferred embodiment of the invention, as illustrated in the accompanying drawing.

THE DRAWING

DETAILED DESCRIPTION

Figure 1:
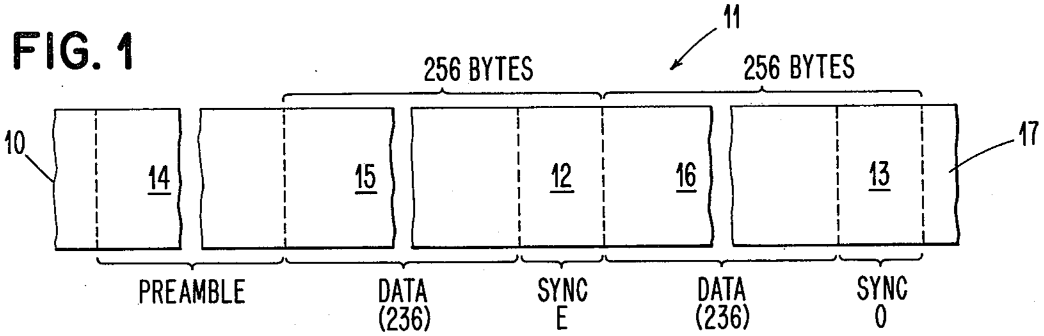
FIG. 1 is a diagrammatic showing of a tape employing resynchronization patterns in accordance with the present invention.

Referring to FIG. 1, a block diagram of a tape record using the present invention is shown. The tape 10 includes a long record 11 including interrecord resync patterns 12 and 13. The record is identified at the leading edge by a preamble 14 using known phase-encoded preamble recording format, such as shown in the proposed American National Standard, "Recorded Magnetic Tape for Information Interchange (1600 CPI, Phase Encoded)"; COMMUNICATIONS OF THE ACM, Volume 13, Number 11, November 1970, Pages 69–685. Following the preamble are interleaved data areas 15, 16, etc. The block 11 is recorded using the nine-track format from the referenced proposed American National Standard. The record itself is divided into segments of 256 record bytes, all of which are phase-encoded recorded. In each segment there are 20 resynchronization bytes and 236 data bytes. The first-occurring resynchronization pattern 12 is called an even-numbered synchronization pattern, while th second-occurring synchronization pattern 13 is termed an odd-numbered synchronization pattern. The even-numbered synchronization patterns are the 0, 2, 4, 6,

8, etc. synchronization patterns from beginning of record. Similarly, the odd-numbered ones, 1, 3, 5, 7, etc., are numbered from the beginning of record.

Figure 1A:
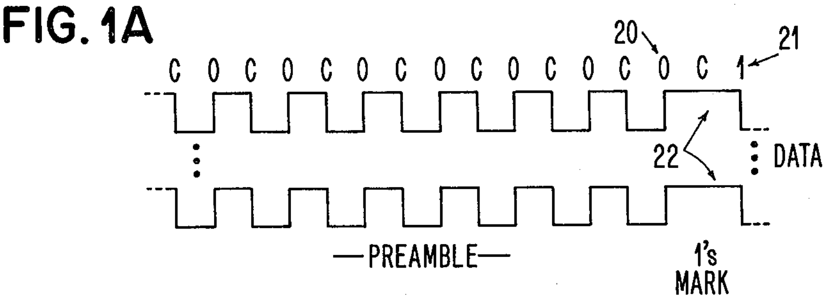
FIG. 1A shows two idealized phase-encoded signal waveforms showning how resync is obtained.

Before proceeding to the detailed description of the preferred resynchronization patterns, the principle involved in resynchronizing phase-encoded recording is described with particular reference to FIG. 1A. A string of 0's represented by up-going flux transitions is separated by interleaved down-going clock transitions. In each data track at the trailing end of the preamble, there is a transition from the last all-0 byte, as at 20, to an all-1's byte (a marker signal byte), as at 21. As a result of the 0-to-1 transitions, there is a long wavelength 22 in each track signifying the end of the 0's strings. Hence, when 0's occurring simultaneously in all tracks followed by an all-1's byte, represented by the single long wavelength in each of the tracks, signifies a resynchronization point for facilitating deskewing, as described by Irwin, supra. Each of the resync patterns 12 and 13 use the FIG. 1A illustrated principles for resynchronization, i.e., a string of 0's followed by an all-1's byte provides resynchronization of the readback clock for phase-encoded recording. As used herein, a "0" means a phase-encoded signal with an up-going (positive going) transition, while a "1" means a phase-encoded signal with a down or negative-going transition.

Figure 2A:
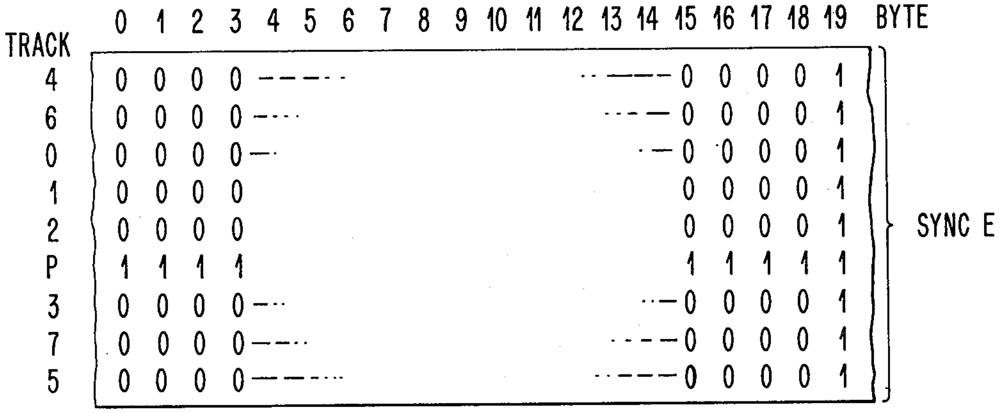
FIGS. 2A and 2B are two exemplary resync patterns respectively for even- and odd-numbered resync positions.
Figure 2B:
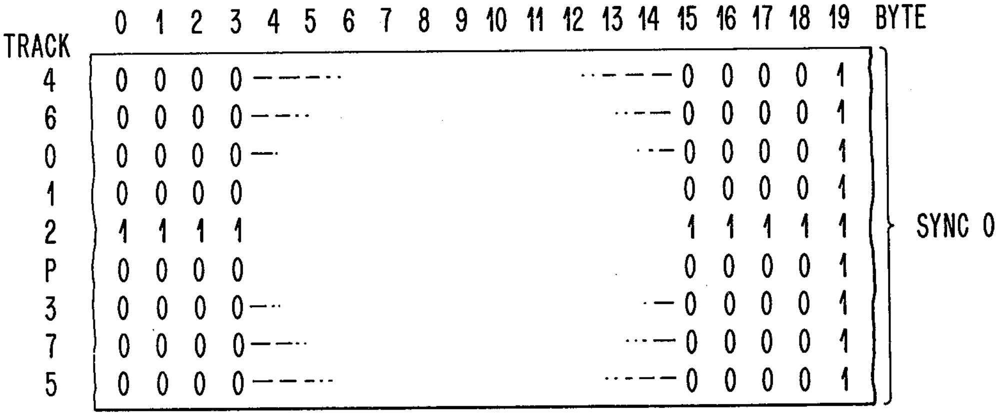

Referring to FIGS. 2A and 2B, two asymmetrical resync patterns are shown. The described resync patterns are most useful in extremely long records where end-of-data determinations are minimal. Referring to FIG. 2A, tracks 0 through parity (8) are shown in an exemplary track arrangement for ½ inch tape. The 20 bytes 0–19 for the resync pattern sync-E are listed across the top of the figure. All of the tracks in byte positions 0–18, except the parity track, have all 0's; while the parity track has all 1's, termed an "identifying track". Accordingly, in sync-E, all of the tracks except the parity track P can be resynchronized using the principles set forth in FIG. 1A.

For the next or odd-numbered synchronization pattern, sync-0, shown in FIG. 2B, all of the tracks in the resync pattern, except track 2, have all 0's in bytes 0–18. Hence, in the odd resync pattern, the parity track and all tracks except track 2, an identifying track, can be resynchronized during each odd-numbered resync. Both patterns, the even and odd in FIGS. 2A and 2B, end with an all-1's marker byte such that the circuitry used to synchronize the start-of-record based upon the preamble, and as shown in FIG. 1A, may be used for intrarecord resynchronization as well. Sync-E and sync-0 patterns alternately repeat throughout each record based on the 256 byte segment length.

In accordance with the invention, phase-encoded recording can be resynchronized within a record by using legal data patterns interleaved periodically among data bytes, wherein all tracks have 0's except a smaller odd number of tracks, which have all 1's, with the odd number of tracks being alternated between even and odd resynchronization patterns such that any of the tracks used as identifying tracks can be resynchronized in not more than two successive resync patterns. It is also preferred that the outer tracks 4 and 5 never be used as identifying tracks, such as parity in track 2 with all 1's; i.e., 4 and 5 should always be resynchronized since these two tracks are the least reliable of all the tracks on ½ inch tape.

Figure 3:
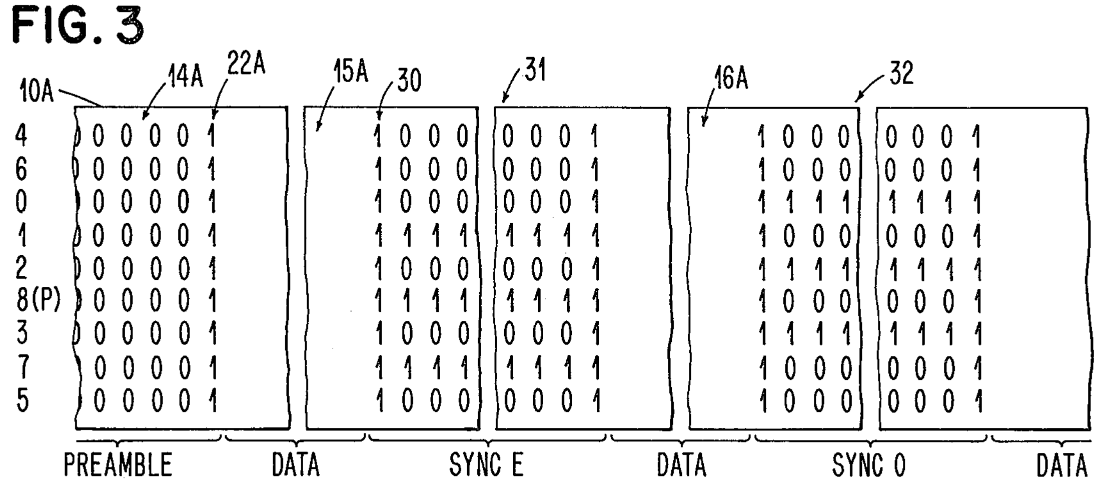
FIG. 3 is a drawing showing resync patterns of the symmetrical type for a nine-track phase-encoded recording.

For improved insensitivity ot a false end-of-data (an all-1's marker byte followed by a series of all 0's), two approaches may be followed. One is that the series of 19 0's in a row is defined as not-end-of-data, i.e., end-of-data requires more than 20 0's after an all-1's byte. In the alternative, more than one track may be an indicating track of all 1's, such as shown in FIG. 3. In the FIG. 3 embodiment, which is designed for bidirectional resynchronization, the ½ inch tape 10A has the preamble 14A as described for FIG. 1. After the all-1's marker byte 22A, data is recorded in a data area 15A. At the end of the data portion of the first segment, as at 30, an all-1's marker byte is recorded. This all-1's marker byte 30 corresponds to byte position 0 in FIGS. 2A and 2B. In byte positions 1–18 (19 bytes), all tracks have 0's except for three indicating tracks selected as 1, 8 (parity), and 7, all tracks being inside tracks, i.e., not adjacent either edge of tape 10A. An odd number of tracks is required to provide a legal data pattern in that odd parity is required for phase-encoded recording. In the even synchronization patterns ES, as at 31, the three tracks 1, 8, and 7 having all 1's are not resynchronizable.

Pattern 31 is followed by another set of data at 16A followed by odd synchronization pattern, OS, 32. Odd pattern 32 is very similar to pattern 31 except that the all-1's indicator tracks are selected to be alternate and interleaved to the indicator tracks of 31; that is, in 32 tracks 0, 2, and 3 are the all-1's indicator tracks. Both resynchronization patterns are ended by an all-1's byte as at 33, 34. Accordingly, as shown in FIGS. 1 and 3, two legal data-pattern-type of resynchronization patterns provide resynchronization within phase-encoded recording.

The advantage of selecting legal data patterns is that magnetic tape recorders not having resynchronization write circuits may record a resynchronizable magnetic tape. Such phase-encoded digital signal recorders are programmed, or otherwise controlled, to record the resync patterns. On readback, when resynchronization is used, the resynchronization circuits shown in FIG. 8 of Irwin, supra, are used. The location of the resync pattern should be predicted as taught by Irwin, supra, such that the resync patterns are not confused with legal data. This is true for both directions of tape transport. Accordingly, for symmetrical resynchronization, it is preferred that the last data section be a full 236 bytes, or whatever number is selected for that particular recording system. The recorder can end with either odd or even synchronization patterns since the readback circuits are responsive to either.

Another advantage of utilizing legal data patterns for resync is that the tapes using phase-encoded recording with interleaved resync can be read by those tape recorders with readback circuits not employing resynchronization capabilities. In such an instance, the resync pattern is successfully read; the resync patterns are transmitted to the host CPU (not shown) as regular data. Programming in the host CPU then recognizes, through suitable programming, that the resynchronization patterns have been interleaved. Then, such resync patterns are deleted prior to data processing.

Figures 4, 4A:
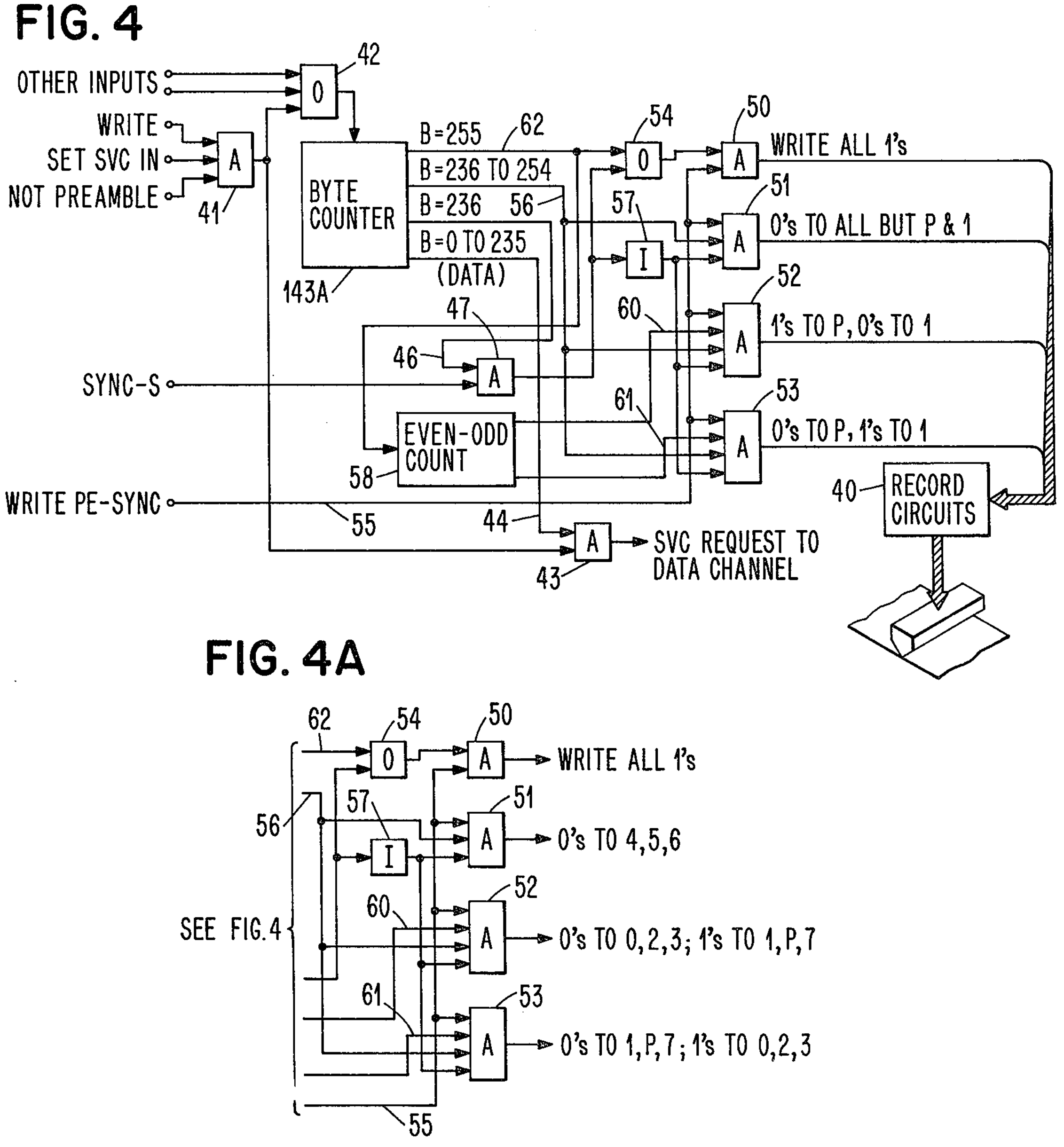
FIG. 4 is a block schematic diagram of a recording control circuit used to write the resync patterns illustrated in FIGS. 2A and 2B.
FIG. 4A is a simplified block schematic diagram of a modification to FIG. 4 for recording the FIG. 3 illustrated resync patterns.

A modification of the FIG. 7 illustrated write resynchronization circuits of Irwin, supra, is shown in FIG. 4 wherein byte counter 143A corresponds to byte counter 143 in start-and-cycle circuits 52 of Irwin, supra. The outputs to the record circuits 40 correspond to the outputs of FIG. 7 of Irwin, supra, such as found on lines 149 and 189. In the present invention, byte counter 143A is incremented whenever AND circuit 41 receives a not-preamble signal from the preamble control (not shown, shown in Irwin, supra), a set-service-in signal, and a write-command signal. AND 41's output activating signal goes through OR circuit 42 to increment byte counter 143A. It also is supplied through a second AND circuit 43 for requesting an additional byte of data from the channel, as described in Irwin, supra.

Byte counter 143A cycles through 0–255 (count is B=X, X=0 to 255) to count each segment of interleaved resynchronized data in a record. When B=0 to 235 (data exchange range), data is being transferred as indicated on the byte counter 143 output line 44. This signal enables the AND circuit 41 signal to be passed by AND 43. When B=236, which corresponds to position 0 of FIGS. 2A and 2B, a signal travels over line 46 to AND circuit 47. AND circuit 47 enabled by the sync-S (symmetrical synchronization) signal to pass the B=236 signal (marker signal state) to generate an all-1's marker byte, as described with respect to FIG. 3, via OR circuit 54 and AND circuit 50. AND circuit 50 enablement is completed by the write-PE-sync command signal received over line 55. For generating FIGS. 2A and 2B illustrated resynchronization patterns, AND circuit 47 remains closed. That pattern is generated by the B=236 to 254 signal (resync range of counter states) on line 56 going to AND's 51, 52, and 53. AND 51 is responsive to that signal plus the write-PE-sync signal and the not-symmetrical signal from AND 47, inverter 57, to cause 0's to be written in all tracks but P and 1. That is, the seven tracks to be resynchronized, except the indicating tracks, always have 0's recorded therein. AND's 52 and 53, together with odd/even count trigger 58, determine which track is the indicating track and should receive all 1's. AND 52 is responsive to trigger 58 being in the even state, as indicated by an activating signal on line 60, as well as the not circuit 57 signal and the B=236 to 254 signal on line 56 to supply 1 to the parity track 8 and 0 to track 1. Hence, AND circuits 51 and 52 gate signals to generate the even-numbered resync patterns. AND 53 generates the 0's and 1's for the odd-numbered resync patterns. In this regard, AND 53 is responsive to the odd/even-count-trigger 58 signal on line 61, plus the write-PE-sync signal and the B=236 to 254 signal on line 56 and the not circuit 57 signal to supply 0's to the parity track and 1's to track 1, thereby generating the odd-numbered resync pattern. Counter 143A also supplies an activating signal over line 62 signifying B=255, i.e., the last byte of each segment. OR 54 passes this signal to AND circuit 50 to write the all-1's byte (byte 19 of FIGS. 2A and 2B). This signal can be supplied to OR circuit 170 of FIG. 7 of Irwin, supra. As shown in FIG. 4, it goes to record circuits 40.

FIG. 4A illustrates further modifications for implementing the symmetrical resync. AND 50 of FIG. 4A is the same AND 50 shown in FIG. 4, it being remembered that OR 54 of FIG. 4 passes the symmetrical command signal from AND 47 to write all 1's in byte position 0 of FIGS. 2A and 2B illustrated resync pattern. AND 51A compares favorably to AND 51, but has different output connections in that its output for always recording 0's only goes to recording circuits for tracks 4, 5, and 6. For even-numbered resync patterns, AND 52A supplies 0's to tracks 0, 2, and 3, and 1's to tracks 1, 7, and parity for generating the even-numbered bidirectional or symmetrical resync pattern shown in FIG. 3. Correspondingly, AND 53 responds to the FIG. 4 illustrated circuits to supply 0 signals to tracks 1, 7, and parity; while 1 signals go to tracks 0, 2, and 3 for bytes 1–18, as previously described.

In reading back phase-encoded tapes recorded in accordance with the present invention, the resnyc readback circuits shown in FIG. 8 of Irwin, supra, can be employed. The particular data pattern occurring at an estimated resnyc position, as shown by numerals 12 and 13 of FIG. 1, causes resync to be initiated. The operation can be the same as described by Irwin, supra, except that the numbers are changed and the resync patterns are different.

When employing deskewing buffers with readback circuits having a relatively large number of registers, for example, 32, when resyncing with respect to phase-encoded recording, which has a maximum skew capability of about four bytes from the tape, the skew buffer can be reset to the reference position as soon as all the skew buffer data has been read out. Accordingly, all the tracks being resynchronized (only those tracks having all 0's) can be preset and started out at the long wavelength by the ending 1's byte of each resync pattern. Of course, the indicator tracks must continue deskewing the 1's to keep in step with tape transport. After this first line-up operation (requires two resync patterns, one odd and one even, for all tracks) on the read backward, then the remaining portion of the read backward, for that particular data record, continues in the same manner as reading forward; i.e., the reference positions of the skew buffers always have a preset relationship to the trailing all-1's byte of each synchronization pattern. This is limited to those cases wherein all data can be cleared from the skew buffers prior to encountering an all-1's byte, for example, only in those skew buffers having fewer positions than the number of 0's intervening between pattern all-1's marker bytes of a given resync pattern. All of the described resync operations are repeated many times for each long phase-encoded record.

Figure 5:
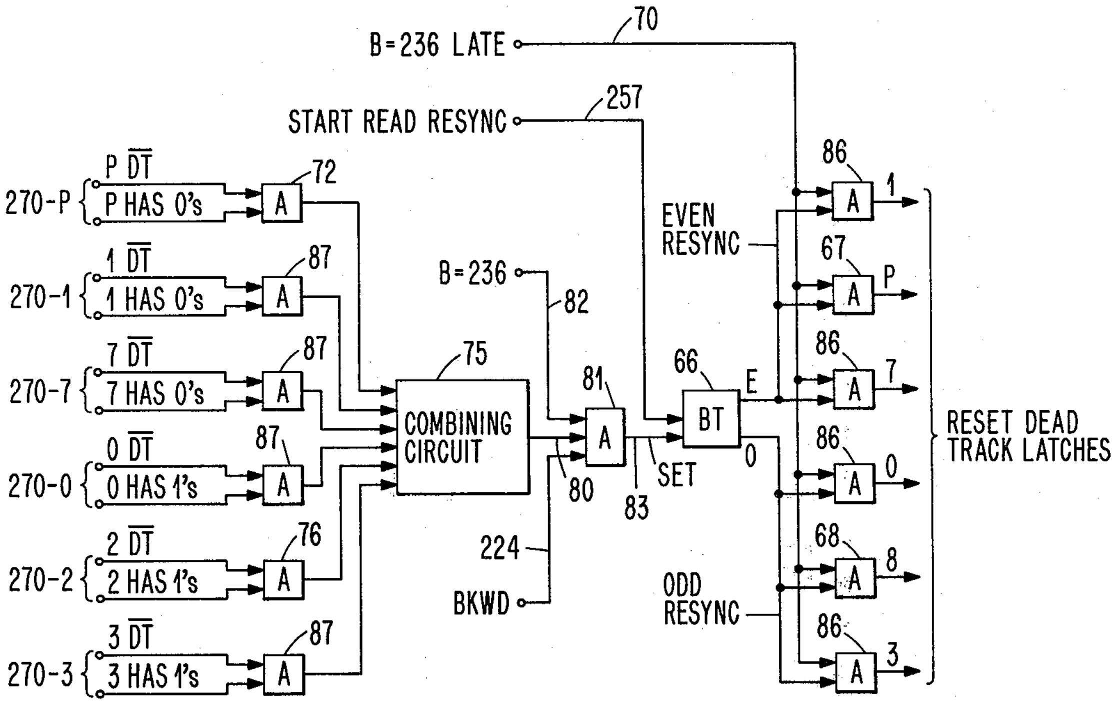
FIG. 5 is a simplified block schematic diagram of a circuit for detecting whether a resync pattern is an odd or even type pattern and some read resync control circuits suitable for symmetrical resync recording.

Referring now more particularly to FIG. 5, conrtrol of deadtrack latches with respect to the indicator tracks in the even and odd resynchronization patterns and detection of whether an even or odd resynchronization pattern is being read is described. The corresponding drawing in U.S. Pat. No. 3,641,534 is FIG. 8. In that figure, deadtrack latches 270 (not shown in the present drawing) control the initiation of the phase tests. In accordance with the present invention, those deadtrack latches 270 (FIG. 8, U.S. Pat. No. 3,641,534) which have been set to indicate a deadtrack and corresponding to the indicator tracks of all 1's stay set throughout the resynchronization pattern. This action ensures that false data is never read from a track not supplying valid data signals. For definition of a deadtrack, see Miller U.S. Pat. No. 3,262,097.

Binary trigger (BT) 66 identifies odd and even resynchronization patterns and inhibits resyncing the indicator tracks (all 1's). Each time a read resync is started, as by the start read resync signal on line 257 of FIG. 8 of U.S. Pat. No. 3,641,534, and also identified in FIG. 5 of the present application as line 257, switches binary trigger (BT) 66 between its odd and even states for alternately and successively actuating the reset deadtrack latch AND circuits 67 and 68, respectively, for tracks P(8) and track 2 (FIGS. 2A and 2B), respectively. When employing binary trigger 66 in a read forward mode, the first resync pattern encountered is always an even resync pattern. Hence, in initializing binary trigger 66, it is initially set to the odd state by initialization circuits (not shown) as is usual in initializing recorders. Then, at the onset of reading a resync pattern, the start read resync signal received over line 257 switches binary trigger 66 to the even state for enabling AND circuit 267 to pass a reset deadtrack latch signal generated from the line 70 B=236 signal. The line 70 B=236 signal of the present description corresponds in U.S. Pat. No. 3,641,534, FIG. 8, to the output of the read resync latch 256 AND circuit (unnumbered) (also receiving an input from ROC=15 on line 266).

In the symmetrical resynchronization mode of operation, during a read backward, it is not known whether the first encountered resynchronization pattern is an even or odd type. It is important to avoid false data and end of data indications to quickly determine whether the first encountered resynchronization pattern is odd or even. This is accomplished by the FIG. 5 illustrated circuits by taking signals from those tracks of the record medium having good signals, i.e., are not deadtracked, and evaluating whether or not such tracks have all 0's or all 1's. In the FIGS. 2A and 2B illustration, parity track and track 2 are alternately used for odd/even indicating tracks. In this regard, AND circuit 72 responds to a deadtrack latch 270 (of U.S. Pat. No. 3,641,534, FIG. 8, not shown) being reset, i.e., not deadtracked, for parity track P as received over line 270-P and an indication on line 74 from a data detector (not shown) that such parity track P has a string of recorded 0's to supply an actuating signal to combining circuit 75. Combining circuit 75 examines such actuating signals from both AND's 72 and 76 to indicate an odd or even resync pattern. A parity track having all 0's, as shown in FIG. 2B, indicates an odd synchronization pattern. This parity track 0's pattern corresponds to track 2 having all 1's. Accordingly, AND circuit 76 responds to the signal on line 270-2 received from a deadtrack latch (not shown and as above stated for the parity track) and a signal received over line 77 from a data detector (not shown) that track 2 has a string of 1's to indicate that the synchronization pattern being encountered is odd. Combining circuit 75 may be a logic OR circuit responding to the output signal of either AND 72 and AND 76 to supply an odd synchronization pattern indicating signal over line 80 which eventually sets binary trigger 66 to the odd state. AND circuit 81 ensures that it emits the setting signal to BT 66 only after the line 257 start read resync signal. In this regard, the B=236 signal received over line 82 and corresponding to the signal on line 269 of FIG. 8, U.S. Pat. No. 3,641,534, allows AND 81 to supply a trigger 66 setting signal over line 83 only after the start read resync signal has been received. Backward signal on line 224 corresponding to line 224 of FIG. 8 of U.S. Pat. No. 3,641,534 also ensures that AND circuit 81 only supplies its signal during the read backward mode. In the event combining circuit 75 and AND circuit 81 are used for controlling the selection of AND's 67 and 68, the B=236 signal on line 70 is delayed such that binary trigger 66 can assume the appropriate state prior to the time the line 70 signal activates AND's 67 and 68. This delay can be accomplished by inserting a delay line (not shown) in line 70. It will be remembered that line 70 was equated to line 269 of FIG. 8, U.S. Pat. No. 3,641,534.

As above stated, in the symmetrical resynchronization embodiment of the invention, it was preferred that in each resync pattern a plurality of tracks have all 1's. To this end, additional AND circuits 86 are placed in an array with AND's 67 and 68 for resetting the above-mentioned deadtrack latches, while additional AND circuits 87 are added as inputs to combining circuit 75 operating as described for AND's 72 and 76. In this regard, combining circuit 75 can still be a logic OR circuit. With six input AND circuits 72, 76, and 87, for enhancing reliability, the combining circuit can be a majority logic decision circuit such that, out of the six tracks being sampled, it may be required that four of the AND's must supply activating signals to combining circuit 75 before a binary trigger 66 setting signal is supplied for indicating an odd resync pattern. For further reliability, a separate circuit (not shown) may be provided in parallel with combining circuit 75 for detecting whether or not an even resynchronization pattern is being detected. In this regard, an Exclusive-OR circuit (not shown) may receive signals from both of the combining circuits for ascertaining whether or not a valid even or odd resync pattern has been detected. Such reliability would be in addition to the multiple track error circuits found in digital signal recorders and as shown in U.S. Pat. No. 3,641,534, FIG. 8, as item 300.

While the invention has been particularly shown and described with reference to a preferred embodiment thereof, it will be understood by those skilled in the art that various changes in form and detail may be made therein without departing from the spirit and scope of the invention.

What is claimed is:

1. A multitrack digital signal recorder having a transducer for each track for recording signals on a record medium having longitudinal edges parallel to record tracks on said medium, circuit means for exchanging data signals with said transducers as parallel bytes of signals, one signal exchanged through each transducer for each byte, the improvement including in combination:

means indicating that a given number of bytes has been exchanged with said transducers;

an odd/even counter; and resynchronization means responsive to said indicating means and to said odd/even counter to perform a resynchronization operation with respect to said recorder of a first type when said odd/even counter is indicating an even count and of a second type when said odd/even counter is indicating an odd type, said first and second types of resynchronization operations yielding a different resynchronization capability with respect to predetermined ones of said tracks.

2. The digital signal recorder set forth in claim 1 for a phase-encoded record system wherein said resynchronization means includes:

first means for exchanging successive zero signals between said transducers and said rresynchronization means operatively associated with tracks adjacent longitudinal edges of said record medium; and resynchronization second means for selectively exchanging all-0 signals on all-1 signals between said transducers for respective ones of said predetermined tracks and said resynchronization means, none of said predetermined tracks being adjacent a longitudinal edge of said record medium.

3. The digital signal recorder set forth in claim 2 having a parity track centrally between said longitudinal edges and furthr including in combination:

said resynchronization means includes even resync means for employing successive 1 signals with respect to said parity track and all-0 signals with respect to another one of said other predetermined tracks;

odd sync means in said synchronization means for employing successive 0 signals with respect to said parity track and successive 1 signals with respect to said one other track;

said even and odd resync means respectively performing said first and second types of resynchronization operations.

4. The digital signal recorder set forth in claim 3 further including in combination:

a byte counter having a plurality of output signals indicating at least two ranges of byte counts, one of said ranges indicating transferring data signals and a second of said ranges indicating transferring predetermined resynchronization signals;

said first and second means being responsive to said byte counter second range signal for exchanging their said respective signals; and additional means responsive to a last numerical value of said byte counter for exchanging all 1's with all transducers for all said tracks of said medium irrespective of said odd/even counter.

5. The digital signal recorder set forth in claim 2 wherein said first means exchanges successive 0 signals only to outermost tracks adjacent said longitudinal edges;

said second means including means for exchanging successive 1 signals with an odd number greater than one of said tracks intermediate said outermost tracks and means for supplying successive 0 signals to all other ones of said tracks;

means in said second means responsive to said odd-/even counter for selectively reversing which ones of said other ones of said tracks have successive 1 and 0 signals exchanged therewith, respectively; and means for recording all-1 signals of one byte in all of said tracks after said successive 1 and 0 signals.

6. The digital signal set forth in claim 1 wherein said resync means includes means to exchange successive 1 signals with an odd plurality of said other tracks, while said other means exchanges successive 0 signals with all remaining tracks; and further means responsive to said odd/even counter to exchange successive 1 signals with said remaining tracks except for ones of said tracks immediately adjacent said longitudinal edges.

7. The digital signal recorder of claim 1 for phase-encoded recording and wherein said resync means includes in combination:

a byte counter having ranges of count states indicating data signal exchange, resynchronization signal exchange, and marker signal exchange;

a first AND circuit responsive to said marker signal count state for supplying an output signal resulting in all-1's signal byte being exchanged with all tracks and receiving inputs from at least said byte counter for exchanging said all-1's signal byte at least once for said resync pattern;

a second AND circuit responsive to said byte counter indicating said resynchronization signal exchange states for activating exchange of a succession of 0 signals with predetermined ones of said tracks including two tracks adjacent said longitudinal edges, respectively;

third AND circuit means responsive to said byte counter resynchronization signal exchange states and to said odd/even counter to activate exchanging a succession of 0 signals with certain ones of said tracks intermediate said outermost tracks and for exchanging 1 signals with predetermined ones of said other tracks, said predetermined number of tracks being odd; and fourth AND circuit means responsive to said byte counter being in said resynchronization signal exchange states and said odd/even counter to actuate exchange of successive 0 signals with certain ones of said tracks intermediate said outermost tracks and for actuating exchanging successive 1 signals with an odd number of given ones of said tracks, the number of given tracks being odd and none of the given tracks being said predetermined tracks.

8. The digital signal recorder set forth in claim 7 wherein said first AND circuit means is responsive to said byte counter marker signal states to record all 1's at the beginning byte position and at the ending byte position of each and every resync pattern.

9. A multitrack digital signal recorder having a transducer for each track, circuit means for exchanging data signals with said transducers as bytes of signals, one signal with each of said tracks for each byte, said tracks being on a record medium with two of said tracks being adjacent longitudinal edges, respectively, and being termed outer tracks, the improvement including in combination:

means indicating that a given number of bytes have been exchanged with said transducers; and resynchronization means responsive to said indicating means for effecting a resynchronization operation having first and second characteristics, said resync operations with said first and second characteristics being applied alternately and successively.

10. The digital signal recorder set forth in claim 9 wherein:

said first resynchronization characteristic comprises resynchronization operations with respect to all said tracks excepting at least a first given one track other than said outer tracks; and said second resynchronization characteristic comprises resynchronization operations with respect to all said tracks excepting at least a second given one track other than said outer track an said first given one track.

11. The digital signal recorder set forth in claim 9 wherein said first given and second given ones of said tracks each comprise an odd number of tracks greater than one.

12. The digital signal recorder set forth in claim 11 further including in combination:

bistable means indicating said first and second characteristics; and means responsive to said resynchronization operations exhibiting said first and second characteristics to alter said bistable means.

13. The digital signal recorder set forth in claim 11 further including means indicating exchange of successive 1's and 0's signals with said tracks;

a combining circuit responsive to said successive 1 or 0 exchange to supply a control signal; and mode control means responsive to said control signal to actuate said resynchronization means to effect at least one of said resynchronization operations to exhibit either said first or second characteristics.

* * * * *